United States Patent
Popescu-Stanesti et al.

(10) Patent No.: US 7,414,381 B2
(45) Date of Patent: *Aug. 19, 2008

(54) CHARGING CIRCUIT FOR PARALLEL CHARGING IN MULTIPLE BATTERY SYSTEMS

(75) Inventors: Vlad Popescu-Stanesti, San Jose, CA (US); Marian Niculae, San Jose, CA (US); Constantin Bucur, Santa Clara, CA (US)

(73) Assignee: O2Micro International Limited, Grand Cayman (KY)

( * ) Notice: Subject to any disclaimer, the term of this patent is extended or adjusted under 35 U.S.C. 154(b) by 54 days.

This patent is subject to a terminal disclaimer.

(21) Appl. No.: 11/425,244

(22) Filed: Jun. 20, 2006

(65) Prior Publication Data

US 2006/0244420 A1 Nov. 2, 2006

Related U.S. Application Data

(63) Continuation of application No. 10/648,891, filed on Aug. 27, 2003, now Pat. No. 7,064,521, which is a continuation-in-part of application No. 10/364,228, filed on Feb. 11, 2003, now Pat. No. 6,977,482, and a continuation-in-part of application No. 10/618,901, filed on Jul. 14, 2003, now Pat. No. 6,861,823, which is a continuation of application No. 10/328,466, filed on Dec. 23, 2002, now Pat. No. 6,611,129, which is a continuation of application No. 09/948,828, filed on Sep. 7, 2001, now Pat. No. 6,498,461.

(60) Provisional application No. 60/484,635, filed on Jul. 3, 2003, provisional application No. 60/457,826, filed on Mar. 26, 2003, provisional application No. 60/313,260, filed on Aug. 17, 2001.

(51) Int. Cl.
*H02J 7/00* (2006.01)
(52) U.S. Cl. .................... 320/126; 320/149
(58) Field of Classification Search ............. 320/126, 320/146–149, 138
See application file for complete search history.

(56) References Cited

U.S. PATENT DOCUMENTS 5,442,274 A * 8/1995 Tamai .................. 320/146

(Continued)

FOREIGN PATENT DOCUMENTS

JP 2000032683 1/2000

OTHER PUBLICATIONS

Supplemental European Search Report dated Aug. 21, 2006, received in corresponding PCT Application No. PCT/US2004/010009 (3 pages).

(Continued)

*Primary Examiner*—Gary L Laxton
*Assistant Examiner*—Samuel Berhanu
(74) *Attorney, Agent, or Firm*—Grossman, Tucker, Perreault & Pfleger PLLC

(57) ABSTRACT

A charging circuit for controlling a system charging parameter provided to a host of rechargeable batteries, wherein the host of batteries includes at least a first battery and second battery that may be coupled in parallel. The charging circuit provides for fast charging of rechargeable batteries in parallel. Independent current and voltage sensing for each battery enables parallel charging of batteries at different charging currents. The charging circuit may be configured to accept either analog or digital signals from an associated power management unit.

12 Claims, 9 Drawing Sheets

U.S. PATENT DOCUMENTS

| | | | |
|---|---|---|---|
| 5,715,156 A * | 2/1998 | Yilmaz et al. | 363/142 |
| 5,760,570 A | 6/1998 | Nagai et al. | |
| 5,801,514 A | 9/1998 | Saeki et al. | |
| 5,903,764 A | 5/1999 | Shyr et al. | |
| 5,905,361 A | 5/1999 | Saeki et al. | |
| 5,917,308 A | 6/1999 | Brooke | |
| 5,959,368 A | 9/1999 | Kubo et al. | |
| 6,037,750 A * | 3/2000 | Von Novak | 320/132 |
| 6,177,779 B1 | 1/2001 | Eguchi | |
| 6,184,660 B1 * | 2/2001 | Hatular | 320/141 |
| 6,204,633 B1 * | 3/2001 | Kitagawa | 320/128 |
| 6,268,711 B1 | 7/2001 | Bearfield | |
| 2001/0013767 A1 | 8/2001 | Takemoto | |

OTHER PUBLICATIONS

Supplementary European Search Report, dated Aug. 8, 2006, received in corresponding European Application (3 pages).

Japanese Notice of Reasons for Rejection with English translation dated Oct. 24, 2006 recieved in corresponding Japanese Patent Application Serial No. 2005-510056 (5 pages).

English translation of Japanese Notice of Reasons for Rejection dated Nov. 14, 2006 recieved in related Japanese Patent Application Serial No. 2005-518382 (3 pages).

English language translation of Chinese Office Action dated May 11, 2007, 13 pages.

Supplementary European Search Report, dated Aug. 8, 2006, recieved in corresponding European Application (3 pages).

\* cited by examiner

FIG. 5

| SIGNAL STATES | USE SIGNALS INDICATE BATTERY A | | USE SIGNALS INDICATE BATTERY B | | USE SIGNALS INDICATE BATTERY A AND B IN PARALLEL | | USE SIGNALS INDICATE BATTERY A AND B | | | | USE SIGNALS INDICATE NEITHER BATTERY A OR B |
|---|---|---|---|---|---|---|---|---|---|---|---|
| | 502→ | 504→ | 506→ | 508→ | 510→ | 512→ | 514→ | 516→ | 518→ | 520→ | 522→ |
| USE_A | LOW | LOW | HIGH | HIGH | LOW | LOW | LOW | LOW | LOW | LOW | HIGH |
| USE_B | HIGH | HIGH | LOW | LOW | LOW | LOW | LOW | LOW | LOW | LOW | HIGH |
| LOWER VOLTAGE BATTERY | X | X | X | X | X | X | A | A | B | B | X |
| CHARGING CURRENT SIGNAL | LOW | HIGH | LOW | HIGH | LOW | HIGH | LOW | HIGH | LOW | HIGH | LOW |
| VINP1 | HIGH | HIGH | HIGH | HIGH | HIGH | HIGH | HIGH | HIGH | HIGH | HIGH | LOW |
| CHGEN | HIGH | HIGH | HIGH | HIGH | HIGH | HIGH | HIGH | HIGH | HIGH | HIGH | LOW |
| PBUE | LOW | LOW | LOW | LOW | HIGH | HIGH | LOW | LOW | LOW | LOW | LOW |

| SWITCH STATES | | | | | | | | | | | |
|---|---|---|---|---|---|---|---|---|---|---|---|
| SW1 | ON | ON | ON | ON | ON | ON | ON | ON | ON | ON | ON |
| SW2 | OFF | OFF | OFF | OFF | OFF | OFF | OFF | OFF | OFF | OFF | OFF |
| SW3 | ON | ON | OFF | OFF | ON | ON | ON | ON | OFF | OFF | OFF |
| SW4 | OFF | OFF | OFF | OFF | OFF | OFF | ON | ON | OFF | OFF | OFF |
| SW5 | OFF | OFF | ON | ON | ON | ON | OFF | OFF | ON | ON | OFF |
| SW6 | OFF | OFF | OFF | OFF | OFF | OFF | OFF | OFF | ON | ON | OFF |

500

CHARGING CIRCUIT FOR PARALLEL CHARGING IN MULTIPLE BATTERY SYSTEMS

CROSS REFERENCE TO RELATED APPLICATIONS

This application is a Continuation application of application Ser. No. 10/648,891 filed Aug. 27, 2003, now U.S. Pat. No. 7,064,521, the teachings of which are incorporated herein by reference, which itself is a continuation-in-part application of U.S. Nonprovisional application Ser. No. 10/364,228 filed Feb. 11, 2003, now U.S. Pat. No. 6,977,482, the teachings of which are incorporated herein by reference, and claims the benefit of U.S. Provisional Application No. 60/457,826 filed Mar. 26, 2003 and U.S. Provisional Application No. 60/484,635 filed Jul. 3, 2003, the teachings of both of which are also incorporated herein by reference application Ser. No. 10/648,891 filed Aug. 27, 2003, now U.S. Pat. No. 7,064,521, is also a continuation-in-part of application Ser. No. 10/618,901 filed Jul. 14, 2003, now U.S. Pat. No. 6,861,823, the teachings of which are incorporated herein by reference, which itself is a continuation of application Ser. No. 10/328,466 filed Dec. 23, 2002, now U.S. Pat. No. 6,611,129, the teachings of which are incorporated herein by reference, which itself is a continuation of application Ser. No. 09/948,828 filed Sep. 7, 2001, now U.S. Pat. No. 6,498,461, the teachings of which are incorporated herein by reference, all of which claim the benefit of Provisional Application Ser. No. 60/313,260 filed Aug. 17, 2001, the teachings of which are incorporated herein by reference.

FIELD OF THE INVENTION

The present invention relates to charging circuits and in particular to charging circuits for charging multiple batteries in parallel.

BACKGROUND OF THE INVENTION

Selector circuits are typically utilized in a power supply block for various electronic devices. Such selector circuits are generally designed to select between a DC power source, e.g., an AC/DC adapter, and a rechargeable battery. In various electronic devices like a laptop computer, such selector circuits are typically controlled via control signals communicated via a System Management Bus (SMBus) according to a specified protocol. In addition, such selector circuits typically cannot independently ascertain, correct, and notify other components in the power supply block of a power crises condition. In addition, such selector circuits are not configured to accept control signals from an associated host power management unit.

Charging circuits are typically utilized to regulate battery charging conditions when a selector circuit has selected one or more batteries for charging. Most charging circuits for use with multiple batteries do not permit charging multiple batteries in parallel. For those charging circuits that do permit charging of multiple batteries, only the total battery charging current is controlled and maintained below a maximum limit. Hence, battery charging time is increased. For example, if two similar batteries were to be charged in parallel in such an instance, the average charging current per battery would only be half of the maximum permitted even if the maximum power level from the associated DC power source (e.g., an AC/DC adapter) is not reached. Accordingly, there is also a need in the art for a charging circuit with enhanced parallel charging capabilities.

BRIEF SUMMARY OF THE INVENTION

A charging circuit for controlling a system charging parameter provided to a host of batteries, wherein the host of batteries includes at least a first battery and second battery that may be coupled in parallel is provided. The charging circuit consistent with the invention includes a first path configured to monitor a first battery charging current level provided to the first battery, a second path configured to monitor a second battery charging current level provided to the second battery; and a regulating circuit configured to reduce the system charging parameter provided to the host of batteries if the first charging current exceeds a first predetermined maximum charging current level or the second charging current exceeds a second predetermined maximum charging current level.

A method for controlling a system charging parameter provided to a host of batteries, wherein the host of batteries comprises at least a first battery and second battery that may be coupled in parallel is provided. The method consistent with the invention includes: monitoring a first battery charging current level provided to the first battery; monitoring a second battery charging current level provided to the second battery; and reducing the system charging parameter provided to the host of batteries if the first charging current level exceeds a first predetermined maximum charging current level or the second charging current exceeds a second predetermined maximum charging current level.

According to another aspect of the invention, there is provided a charging circuit for regulating an output parameter of a DC to DC converter. The output parameter of the DC to DC converter providing power to a host of batteries, wherein the host of batteries comprises at least a first battery and second battery that may be coupled in parallel. The charging circuit consistent with the invention includes: a first path configured to monitor a first battery charging current level provided to the first battery; a second path configured to monitor a second battery charging current level provided to the second battery; a third path configured to monitor a first battery charging voltage level provided to the first battery; and a fourth path configured to monitor a second battery charging voltage level provided to the second battery. The charging circuit also includes a regulating circuit configured to reduce the output parameter of the DC to DC converter if one of the first battery charging current level, the second battery charging current level, the first battery charging voltage level, and the second battery charging voltage level exceeds an associated predetermined maximum level.

According to yet another aspect of the invention there is provided an electronic device. The electronic device consistent with the invention includes: a power management unit configured to provide an output signal representative of at least a first predetermined maximum charging current level and a second predetermined maximum charging current level; a host of batteries including at least a first battery and a second battery coupled in parallel; and a charging circuit for controlling a system charging parameter provided to the host of batteries. The charging circuit includes: a first path configured to monitor a first battery charging current level provided to the first battery and compare the first battery charging current level to the first predetermined maximum charging current level; a second path configured to monitor a second battery charging current level provided to the second battery and compare the second battery charging current level to the second predetermined maximum charging current level; and a regulating circuit configured to reduce the system charging parameter provided to the host of batteries if the first charging current exceeds the first predetermined maximum charging current level or the second charging current exceeds the second predetermined maximum charging current level.

In yet a further aspect of the invention, there is provided an electronic device that may be powered by one or more of a host of rechargeable batteries or a DC power source. The electronic device consistent with the invention includes: a power management unit (PMU) configured to run a power management routine; a charging circuit configured to control charging of the host of rechargeable batteries, wherein the host of batteries includes at least a first battery and a second battery coupled in parallel, the charging circuit including: a first path configured to monitor a first battery charging current level provided to the first battery and compare the first battery charging current level to the first predetermined maximum charging current level; a second path configured to monitor a second battery charging current level provided to the second battery and compare the second battery charging current level to the second predetermined maximum charging current level; and a regulating circuit configured to reduce the system charging parameter provided to the host of batteries if the first charging current exceeds the first predetermined maximum charging current level or the second charging current exceeds the second predetermined maximum charging current level; and a selector circuit configured to select at least one of the DC source and the host of batteries in response to a PMU output signal from the PMU.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 5 is an exemplary table illustrating how the selector circuit drives various switches to ON and OFF states dependent on various input signals when the electronic device is powered by a DC power source;

DETAILED DESCRIPTION

Figure 1:
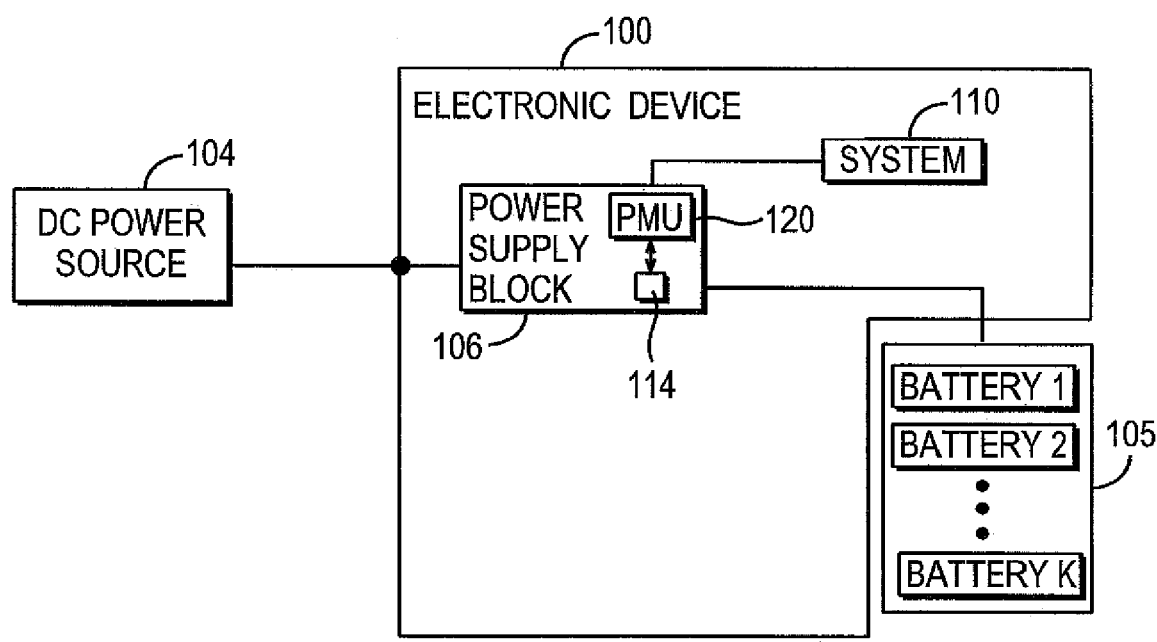
FIG. 1 is a simplified high level block diagram of an electronic device with a power supply block having a selector circuit consistent with the invention that makes a selection in response to an output signal from a power management unit (PMU)

Turning to FIG. 1, a simplified block diagram of an electronic device 100 capable of being powered from any number of power sources 104, 105 is illustrated. Such power sources may include a plurality of batteries 105 and a DC power source 104. The batteries 105 may further be rechargeable batteries of various types such as lithium-ion, nickel-cadmium, nickel-metal hydride batteries, or the like. The electronic device 100 may be any variety of devices known in the art such as portable electronic devices (laptop computers, cell phones, pagers, personal digital assistants, and the like), an electric powered vehicle, power tools, etc. that may be powered from either power source 104, 105 in various instances.

If the electronic device 100 is a laptop computer it would include a variety of components known to those skilled in the art which are not illustrated in FIG. 1. For example, the laptop may include an input device for inputting data to the laptop, a central processing unit (CPU) or processor, for example a Pentium processor available from Intel Corporation, for executing instructions and controlling operation of the laptop, and an output device, e.g., a LCD or speakers, for outputting data from the laptop.

To recharge batteries 105 and/or supply power to the device 100, a DC power source 104 may be coupled to the device 100. The DC power source 104 may be an AC/DC adapter which is configured to receive conventional 120 volts AC from a wall outlet and convert it to a DC output voltage. The DC power source 104 may also be a DC/DC adapter such as a "cigarette lighter" type adapter configured to plug into that type of socket. Such a DC power source 104 is illustrated in FIG. 1 as separate from the device 100, but it may be built into some devices.

The device 100 has a power supply block 106 including at least a selector circuit 114 consistent with the present invention. The power supply block 106 may also include a PMU 120 as illustrated in FIG. 1. Alternatively, the PMU 120 may also be embedded in a more complex processor of the electronic device 100. The PMU 120 is configured to run various power management routines as is known in the art. In general, the power supply block 106 includes various components to monitor, control, and direct power from each power source to each other and to the system 110 of the device 100 under various conditions. Advantageously, the selector circuit 114 consistent with the invention is configured to be responsive to at least one output signal from the PMU 120 as further detailed herein.

Figure 2:
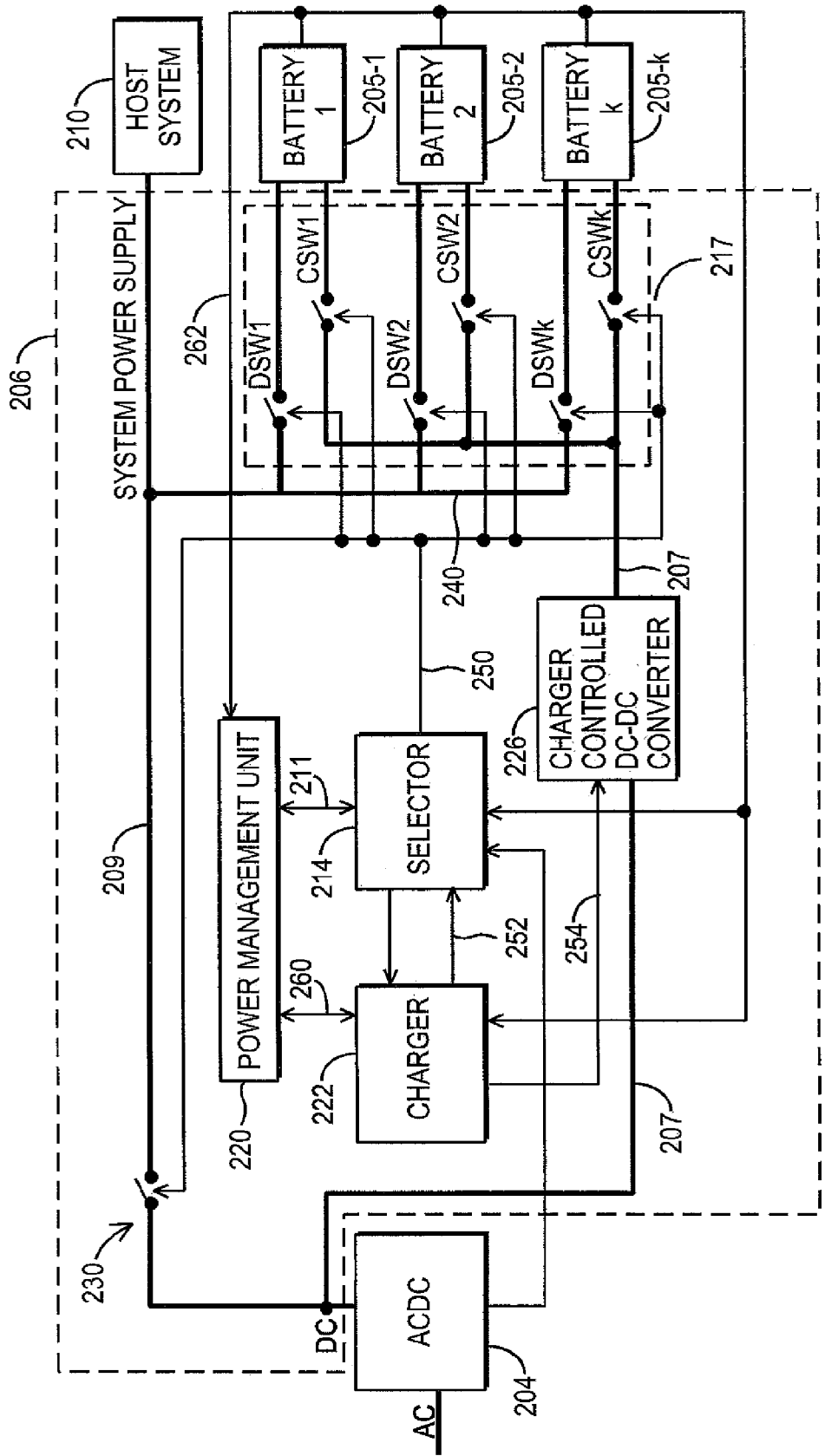
FIG. 2 is a more detailed block diagram of the power supply block portion of FIG. 1 having a selector circuit consistent with the invention for making a selection among a DC power source and a plurality of batteries.

Turning to FIG. 2, a more detailed block diagram of an exemplary power supply block 206 for a multiple battery system is illustrated. The power sources may include the DC source 204, e.g., an AC/DC converter, and any number of a plurality of batteries 205-1, 205-2, 205-k. Such batteries may also be rechargeable batteries. At any point in time, each of these power sources 204, 205-1, 205-2, 205-k may or may not be present in the system.

In general, the power supply block 206 may include a PMU 220, a charger circuit 222, a power conversion element 226, a battery switch network 217, a switch 230, a power supply path 209 from the DC power source 204 to the system 210, a power supply path 240 from the batteries 205-1, 205-2, 205-k to the system, a power supply path 207 from the DC power source 204 to the rechargeable batteries 205-1, 205-2, 205-k for recharging purposes, a selector circuit 214 consistent with the invention, and various data or communication paths. The battery switch network 217 may further contain a charge switch CSW1, CSW2, CSWk and a discharge switch DSW1, DSW2, DSWk for each associated battery 205-1, 205-2, 205-k.

The data or communication paths between the various components of the power supply block 206 may be unidirectional or bi-directional, and may conduct either analog or digital signals. The data paths may transport either command or control signals or data. The number of such data paths is strongly dependent on the particular features of the batteries 205-1, 205-2, 205-k, the charger circuit 222, the PMU 220, and those of the supply block 206 as a whole. For example, if an associated device 100 is a laptop computer, a smart charger circuit and smart batteries can communicate via a System Management Bus (SMBus) according to a specified protocol.

In general, the selector circuit 214 is responsive to various input signals from a variety of components, including the PMU 220, in the supply block 206 to provide switch control signals over path 250 to the battery switch network 217 and the switch 230 to control and direct power from each power source to each other and to the system 210 under various conditions.

For example, a particular set of input signals to the selector circuit 214 may indicate the presence of a DC power source 204 with an acceptable voltage level. In response to such an input signal, the selector circuit 214 could provide a control signal to close (turn ON) switch 230 and to open (turn OFF) discharge switches DSW1, DSW2, DSWk in the battery switch network 217. As such, power from the DC power source 204 would be provided to the system 210. Alternatively, if input signals to the selector circuit indicated the absence of a DC power source 204 or a DC power source with an unacceptable voltage level, the selector circuit 214 would provide an appropriate control signal to turn switch 230 OFF, and to turn one of the discharging switches DSW1, DSW2, DSWk of the battery switch network ON. As such, one or more of the associated batteries 205-1, 205-2, 205-k would provide power to the system 210 as long as other safety conditions were also met as will be further detailed herein.

The charge switches CSW1, CSW2, CSWk for each associated rechargeable battery 205-1, 205-2, 205-k provide a conductive path from the power supply line 207 to each associated battery when the charge switches are ON for charging purposes. The discharge switches DSW1, DSW2, DSWk provide a conductive path from each associated battery 205-1, 205-2, 205-k to the system 210 to power the system 210 from one or more batteries based on which discharge switches DSW1, DSW2, DSWk are ON.

Advantageously, at least one input signal to the selector circuit 214 is representative of an output signal from the PMU 220. Such communication between the PMU 220 and the selector circuit 214 may take place via data path 211. As understood by those skilled in the art, the PMU 220 is capable of running a host device's power management routine. The PMU 220 may provide a host set of signals to the selector circuit 214 including a signal indicating which battery 205-1, 205-2, 205-k, or combination of batteries in parallel, should be selected for charging or discharging. As further detailed herein, the selector circuit 214 is responsive to the PMU 220. However, the selector circuit 220 is further configured to have its own internal checks and can override a desired use signal from the PMU under various conditions as further detailed herein to provide for added safety and battery power savings. The charger circuit 222 is configured to communicate via data path 252 to the selector 214 and via data path 254 to a power conversion unit 226, e.g., a charger controlled DC-DC converter. The charger circuit 222 may control the providing of charging current to the batteries 205-1, 205-2, 205-k via the power supply path 207 and the power conversion unit 226.

Figure 3:
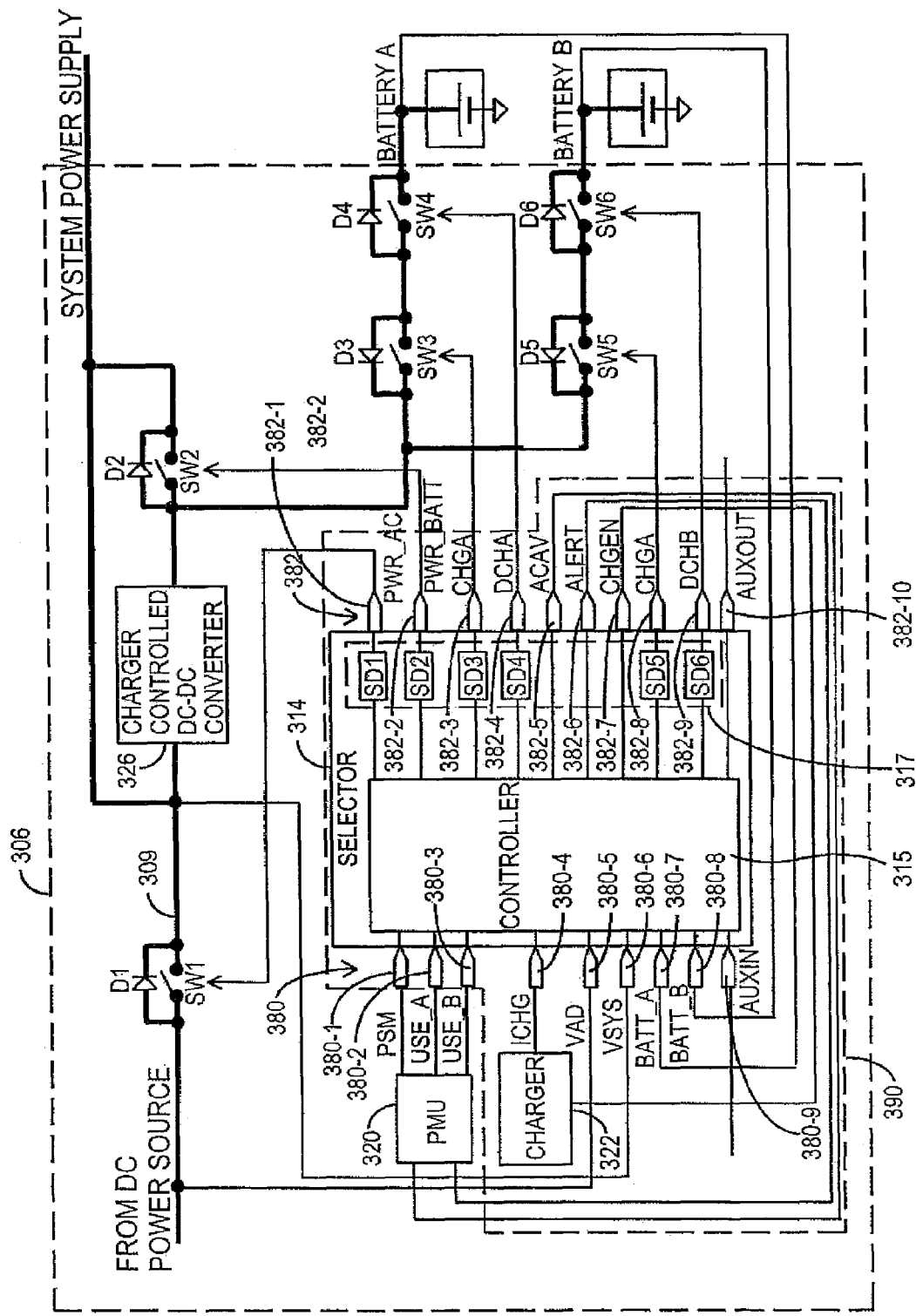
FIG. 3 is a block diagram of one exemplary embodiment of a selector circuit consistent with the invention having a controller configured to provide signals to select among a DC power source and a plurality of batteries via an associated switch driver network and associated switches.

Turning to FIG. 3, an exemplary power supply block 306 for operation in conjunction with three power sources is illustrated. The power sources include a DC power source (not illustrated) coupled to the power supply block 306 via power supply path 309, a first rechargeable Battery A, and a second rechargeable Battery B. The power supply block 306 includes a selector circuit 314 consistent with the invention and other components such as an associated PMU 320, a charger circuit 322, and a power conversion unit 326, e.g., a DC-DC converter. As earlier detailed, although the PMU 320 is illustrated as part of the supply block 306, the PMU 320 may be external to the supply block, embedded in a separate component outside of the power supply block, or the PMU's functionality may be provided by a separate component, e.g., a CPU, of the electronic device.

For clarity and simplicity, the DC source and various data connections (e.g., from the charger circuit 306 to the power conversion unit 326 and to the PMU 320, as well as those between the batteries and the PMU 320) that were previously illustrated in FIG. 2 are not illustrated in FIG. 3. Advantageously, the selector circuit 314 and the charging circuit 322 may be integrated onto one integrated circuit 390 for convenience of operation and installation.

The selector circuit 314 includes a controller 315 and a switch driver network 317 as further detailed herein. The selector circuit 314 has a variety of input terminals 380 to accept a variety of input data and control signals. Such input terminals 380 are also coupled to the controller 315. The selector circuit 314 also has a variety of output terminals 382 to provide control signals to associated switches SW1, SW2, SW3, SW4, SW5, and SW6 and to provide data to associated components of the power supply block 306. The input terminals 380 include terminals 380-1 to 380-9 to accept control and data signals labeled PSM, USE_A, USE_B, ICHG, VAD, VSYS, BATT_A, BATT-B, and AUXIN respectively. The output terminals 382 include terminals 382-1 to 382-10 to provide control and data signals labeled PWR_AC, PWR_BATT, CHGA, DCHA, ACAV, ALERT, CHGEN, CHGB, DCHB, and AUXOUT respectively. Each input terminal 380 and output terminal 382 and their associated control and data signals are generically described below.

The first input terminal 380-1 may accept a power save mode (PSM) digital input control signal from the PMU 320 representative of whether a power save mode is desired by the PMU 320. The second and third input terminals 380-2 and 380-3 may accept USE_A and USE_B control signals from the PMU 320 indicating the PMU's desired battery or combination of batteries to utilize in a given charging or discharging mode. For instance, in the embodiment of FIG. 3 having two batteries A and B the USE_A and USE_B control signals may be digital signals such that if USE_A is low and USE_B is high, use of Battery A is desired. If USE_A is high and USE_B is low, use of Battery B is desired. If USE_A is low and USE_B is low, use of Battery A and Battery B in parallel is desired. Finally, if USE_A is high and USE_B is high, use of neither Battery A nor Battery B is desired. These representative high and low signals for USE_A and USE_B is for illustrative purposes only as those skilled in the art will recognize that other combinations may also be chosen.

The fourth input terminal 380-4 may accept a charging current (ICHG) analog signal from the charger circuit 322 representative of the charging current provided to the batteries. The fifth input terminal 380-5 may accept an analog signal from the DC voltage source 204, e.g., the AC/DC adapter, (VAD) representative of the voltage level provided by the DC power source 204 at that particular time. The sixth input terminal 380-6 may accept an analog signal representative of the system supply voltage level (VSYS). The seventh 380-7 and eighth input terminals 380-8 may accept analog signals from Battery A (BATT_A) and Battery B (BATT_B) representative of the voltage level of each respective battery. Such BATT_A and BATT_B analog signals may be obtained by measuring the voltage at the positive pole of each respective battery. Finally, the ninth input terminal 380-9 represents a generic input terminal capable of receiving any other input control and data signals (AUXIN) considered not critical to the description of the present invention herein.

The first output terminal 382-1 may provide a switch control signal (PWR_AC) to switch SW1. The second output terminal 382-2 may provide a switch control signal (PWR_BATT) to switch SW2. The third output terminal 382-3 may provide a switch control signal (CHGA) to the charging switch SW3 for Battery A. The fourth output terminal 382-4 may provide a switch control signal (DCHA) to the discharging switch SW4 for Battery A. The fifth output terminal 382-5 may provide a digital DC source enable signal (ACAV) indicating the presence or absence of the DC Power source 204 having an output voltage greater than an acceptable threshold limit.

The sixth output terminal 382-6 may provide a digital data signal (ALERT) to notify other components, including at least the PMU 320, of a power crisis condition which will be later detailed herein. The seventh output terminal 382-7 may provide a digital data signal (CHGEN) to the charger which indicates if a charge enable condition has been reached. The eighth output terminal 382-8 may provide a switch control signal (CHGB) to the charging switch SW5 for Battery B. The ninth output terminal 382-9 may provide a switch control signal (DCHB) to the discharging switch SW6 for Battery B. Finally, the tenth output terminal 380-10 represents a generic output terminal capable of providing any other output control and data signals (AUXOUT) considered not critical to the description of the present invention herein.

The controller 315 accepts the above input data and control signals from the input terminals 380 of the selector circuit 314 and makes decisions about which power source or combination of sources (e.g., DC power source, Battery A, or Battery B) to select or deselect by controlling one or more combinations of switches SW1 to SW6. The controller 315 may also provides data and other control signals directly to the other output terminals, e.g, output terminals 382-5, 382-6, 382-7, and 382-10, for communication to other components of the power supply block 306.

The switch driver network 317 may include a plurality of switch drivers SD1, SD2, SD3, SD4, SD5, and SD6. Each of the switch drivers SD1, SD2, SD3, SD4, SD5, and SD6 may be further coupled to an associated switch SW1, SW2, SW3, SW4, SW5, and SW6 in order to drive each switch to ON and OFF positions as instructed by the controller 315 of the selector circuit 314.

Figure 4:
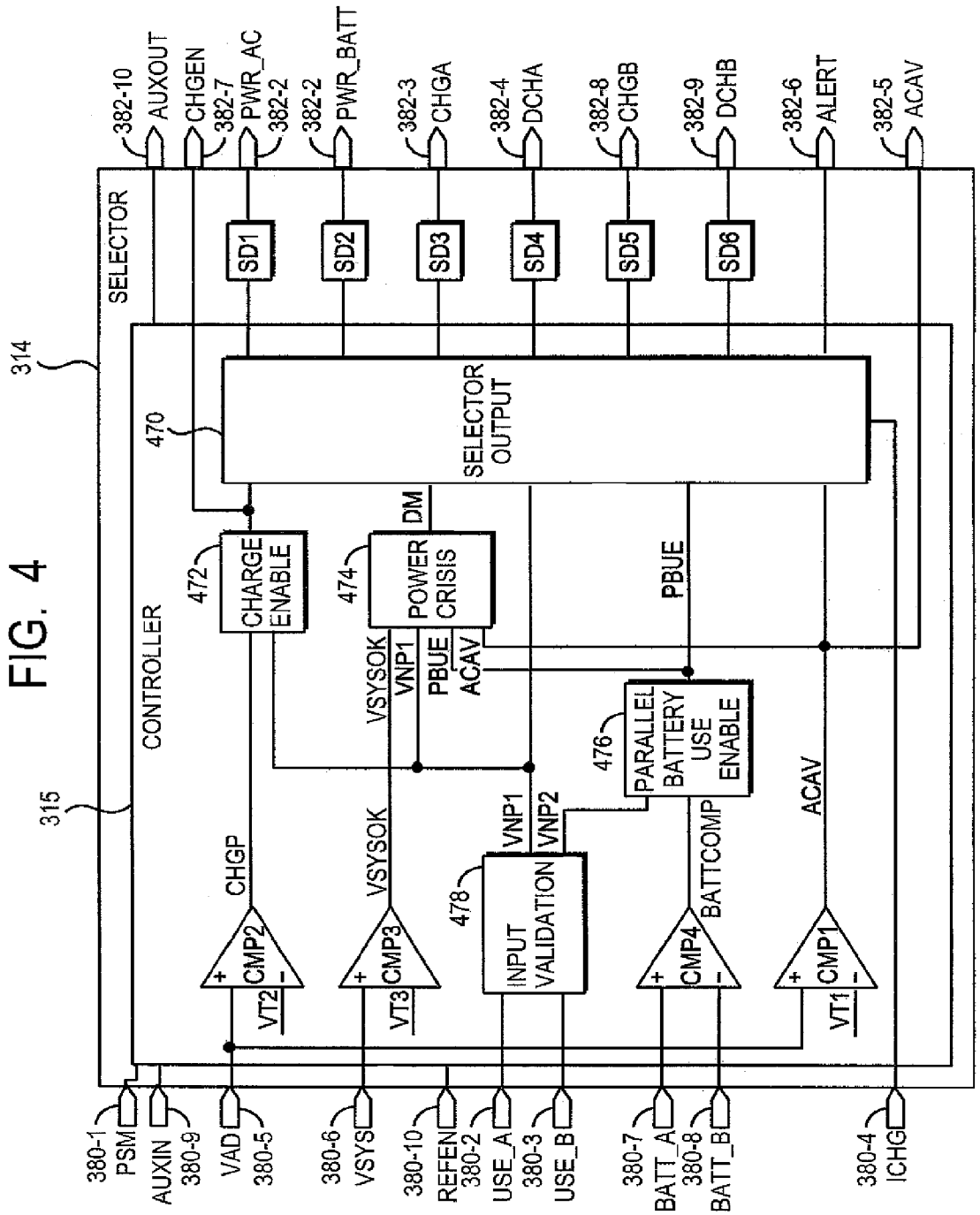
FIG. 4 is a more detailed block diagram of the selector circuit of FIG. 3 illustrating various components of the controller portion in more detail.

Turning to FIG. 4, a more detailed block diagram of the selector circuit 314, and in particular the controller 315 of the selector circuit 314 of FIG. 3 is illustrated. In general, the controller 315 may include a selector output circuit 470, a charge enable circuit 472, a parallel battery use enable circuit 476, an input validation circuit 478, a power crises circuit 474, and a plurality of comparators CMP1, CMP2, CMP3, and CMP4.

In general, the selector output circuit 470 may receive a variety of internal control signals such as a charge enable (CHGEN) signal from the charge enable circuit 472, a diode mode (DM) signal from the power crises circuit 474, a valid input signal (VINP1) from the input validation circuit 478, a parallel battery use enable (PBUE) signal from the parallel battery use enable circuit 476, and a DC source enable signal (ACAV) from comparator CMP1. The selector output circuit 470 may also receive an analog signal ICHG from the charger circuit 322 representative of the charging current. As further detailed herein, the selector output circuit 470 directs the switch driver network 317 to turn associated switches SW1, SW2, SW3, SW4, SW5, and SW6 ON and OFF depending on the state of various input signals.

The controller 315 may include a first comparator CMP1 configured to compare an analog signal representative of the voltage level of the DC source with a first threshold level VT1. The first threshold level VT1 is set higher than minimum supply voltage VT3 acceptable to the system. If the DC power source is present and has a supply voltage greater than the first threshold level VT1, the first comparator CMP1 provides a high ACAV control signal to the selector output circuit 470. Otherwise the first comparator provides a low ACAV signal The ACAV signal may also be provided to the power crisis circuit 474.

If the selector output circuit 470 receives a high ACAV signal from the first comparator CMP1, it will provide appropriate switch control signals to turn switch SW1 ON and turn switches SW2 to SW6 OFF (assuming the DC power source supply voltage is not greater than a second threshold level VT2 as further detailed below) such that power to the system 210 will be provided by the DC power source and no batteries will be recharged. The selector circuit 314 will utilize the DC power source in this instance irrespective of the USE_A and USE_B control signals from the PMU. As such, the selector circuit 314 can override a control signal from the PMU to use Battery A or Battery B and instead require power to the system 210 to be supplied by the DC power source whenever it is present and has a suitable voltage level greater than VT1. Advantageously, this feature prolongs battery life by ensuring use of the DC power source in appropriate circumstances.

To enable powering of the system 210 from the DC source and charging of one or more batteries, the charge enable (CHGEN) signal must be active. An active CHGEN signal in the present embodiment is a high CHGEN signal. The charge enable circuit 472 will provide a high CHGEN signal if it receives an appropriate CHGP signal from the second comparator CMP2, and an appropriate validation signal VINP1 from the input validation circuit 478. The second comparator CMP2 provides the appropriate CHGP signal if the supply voltage from the DC power source is greater than a second threshold level VT2, where VT2>VT1, and VT1>VT3. The input validation circuit 478 provides the validation signal VINP1. An appropriate validation signal VINP1 will be provided if the USE_A and USE_B control signals from the PMU assert the use of at least one of the Batteries A or B. An appropriate validation signal VINP1 will not be sent if the USE_A and USE_B control signals fail to assert the use of any of the Batteries A or B, e.g., if both USE_A and USE_B are high. The charge enable circuit 472 may also need other supplementary validation input signals (AUXIN) from the generic input terminal 380-9 in order to generate an active CHGEN signal.

During charging, the charging circuit 322 provides the ICHG signal to the selector circuit 314 that is representative of a charging current level. The selector circuit 314 accepts the ICHG signal at input terminal 380-4 and provides such signal to the selector output circuit 470. The selector output circuit 470 compares such ICHG signal with a charging threshold level signal ICHT. Based on this comparison, the selector output circuit 470 decides if the charging current level is high or low and turns various switches ON or OFF based on this and other input data as further detailed herein. A low charging current is represented by a low control signal and a high charging current is represented by a high control signal in the present embodiment as detailed in the table of FIG. 5.

The parallel battery use enable circuit 476 provides a parallel battery use enable (PBUE) signal to the selector output circuit 470. The selector output circuit 470 responds to a high PBUE signal by allowing parallel battery use, and responds to a low PBUE signal by not allowing parallel battery use despite a request from the PMU 320 via USE_A and USE_B signals indicating a desire for parallel battery use, e.g., USE_A and USE_B are low. As such, the selector circuit 314 provides additional precautions and protections against using Batteries A and B in parallel unless appropriate conditions are present.

For instance, the concern with using any two or more batteries, e.g., Battery A and Battery B, in parallel is that there is a relatively large difference in potential that creates an undesirable high current conditions when such batteries are connected in parallel. As such, a fourth comparator CMP4 of the controller 315 is configured to compare signals BATT_A and BATT_B. Such BATT_A and BATT_B signals may be analog signals taken from the positive terminal of Battery A and Battery B. If the difference between the two BATT_A and BATT_B signals is within a predefined limit, the comparator CMP4 will provide an active BATTCOMP signal to the parallel battery use enable circuit 476. In addition to receiving an active BATTCOMP signal from the fourth comparator CMP4, the parallel battery use enable circuit 476 should also receive an appropriate input validation signal VINP2 from the input validation circuit 478 to issue an active PBUE signal. An appropriate validation signal VINP2 will be provided if the USE_A and USE_B control signals assert the use of at the Batteries A and B in parallel, e.g., USE_A and USE_B are low.

If the USE_A and USE_B control signals from the PMU indicate parallel battery use is desired by the PMU, but the PBUE signal is not active because the voltage difference between Battery A and Battery B is not within the predetermined limit, the selector output circuit 474 will direct charging to the battery having the lower voltage level compared to the other. Under similar conditions, when no valid DC source is present, the selector output circuit will direct the battery with the higher voltage level compared to the other to provide discharging power to the system.

Advantageously, the selector circuit 314 may also include a power crises circuit 474 designed to independently monitor and identify power crises conditions, and provide an appropriate diode mode (DM) control signal to the selector output circuit 470 in case of a detected power crisis condition. The selector output circuit 470 is responsive to the appropriate DM control signal from the power crises circuit 474 to cause switch drivers from the switch driver network 317 to maintain switches SW2, SW4, and SW6 in an ON state, while maintaining switches SW1, SW3, and SW5 in an OFF state. As such, the power source with the highest voltage (Battery A, Battery B, or the DC power source) will supply the system though one of the diodes D1, D3, or D5 respectively in this diode mode. In addition, the selector circuit 314 will also provide an ALERT condition signal at output terminal 382-6 indicating a power crises condition. The ALERT signal could be provided to a number of components, including at least the PMU 320.

A power crises condition can include an invalid output or an invalid input. An invalid output can occur whenever the power source or sources that are supplying the system can not maintain the system voltage level at the minimum system threshold voltage level VT3. The system voltage level is compared with the minimum threshold voltage level VT3 by comparator CMP3 and a system check control signal VSYSOK is sent to the power crises circuit 474 based on this comparison. A low system voltage power crisis condition may occur if one or more of the power sources are willingly or accidentally disconnected.

An invalid input can also cause a power crises problem. An invalid input could be the PMU asserting through USE_A and USE_B signals a desired condition that would cause the system to lose power. For instance, the USE_A and USE_B signals may assert neither battery to be used (low VINP1 signal), e.g., USE_A and USE_B high, yet the DC power source is not available (low ACAV signal) or cannot keep the system at the minimum VT3 voltage level (low VSYSOK signal). Another invalid input situation may occur if the USE_A and USE_B signals from the PMU, although logically correct, would cause the system to lose power. For instance, the USE_A and USE_B signals may point to supply from one battery that is not present or accidentally removed. Use of such a battery would then cause the voltage level on the system to drop below the VT3 threshold and the VSYSOK signal indicative of this condition would be provided to the power crises circuit 374.

Due to power dissipation on diodes D1, D3, or D5 it is not suitable to maintain the DM supply mode for longer periods of time. Advantageously, the power crisis circuit 474 continuously monitors its input signals to deactivate is DM signal as soon as the power crises condition is remedied. Therefore, as soon as the power crises condition is remedied (e.g., a missing power source is coupled to the system) the internal DM signal from the power crisis circuit becomes inactive and a normal power supply mode is resumed.

Turning to FIG. 5, in conjunction with FIGS. 2 though 4, a table 500 illustrates respective switch states of switches SW1 to SW6 depending on various input signals to the selector circuit 314 and the selector output circuit 470. The table 500 illustrates various switch states when power to the system 210 is provided by the DC power source 204 and not the batteries 305. As such, the ACAV signal is high and the selector output circuit 470 sends appropriate switch control signals to the switch driver network 317 so SW1 is ON and SW2 is OFF as indicated in every column of table 500.

The CHGEN signal is "high" in every column of the table 500 except for the last column 522. As such, not only is the DC source present but the other conditions (the voltage from the DC source>VT2, and a proper input validation signal VINP1 is present) are satisfied to provide the high CHGEN signal. As such, charging is permitted in columns 502 to 520 of table 500.

In columns 502 and 504, the USE_A and USE_B signals are low and high respectively indicating the PMU's desire to use Battery A. As such, the switches SW5 and SW6 to Battery B are OFF in both instances. In column 502, the charging current signal is "low" indicating the charging current from the power conversion unit 226 to the batteries 305 is lower than a threshold charging current level ICHT. As such, the selector output circuit 470 is responsive to the charging current signal by sending appropriate control signals to the switch drive network 317 to turn SW3 ON and SW4 OFF. As such, charging current to Battery A flows through closed SW3 and the diode D4 in parallel with open SW4. Since the charging current is low, its flow through diode D4 will produce negligible power dissipation.

In contrast, the charging current in column 504 is high as indicated by a "high" charging current signal. As such, switches SW3 and SW4 are both ON. Therefore, no excess power is dissipated in diode D4 in this instance since the current flows through the closed switch SW4. Normally, at similar current levels switches SW1 to SW6, when in an ON state, dissipate less power than their corresponding parallel diodes D1 to D6. This difference is particularly important at high current levels.

Turning to columns 506 and 508, the USE_A and USE_B signals are high and low respectively indicating the PMU's desire to use Battery B. As such, the switches SW3 and SW4 to Battery A are OFF. Column 506, somewhat similarly to column 502, has a low charging current as represented by the low charging current signal. As such, switch SW5 is ON and SW6 is OFF. Charging current to Battery B therefore flows through closed switch SW5 and the diode D6 in parallel with open switch SW6. In contrast, the charging current in column 508 is high as represented by the high charging current signal. As such, switches SW5 and SW6 are ON such that no power is dissipated in diode D6 in this instance.

Turning to columns 510 to 520, the USE_A and USE_B signal are low and low respectively indicating the PMU's desire to use Battery A and Battery B in parallel. If the parallel battery use enable (PBUE) signal is high as indicated in columns 510 and 512, parallel charging of the Batteries A and B will be permitted. Switches SW3 to SW6 will all be ON if the charging current is high (charging current signal is high) as illustrated in column 512. Switches SW3 and SW5 will be ON and switches SW4 and SW6 will be OFF if the charging current is low (charging current signal is low) as illustrated in column 510.

If the USE_A and USE_B signals indicate the PMU's desire to use Battery A and Battery B in parallel, but the PBUE signal is low, the selector circuit 314 will not permit parallel battery operation thereby overriding the PMU's desired parallel operation. With all else being acceptable, the selector circuit 314 will permit charging of the battery with the lower voltage level. For instance, columns 514, 516 indicate Battery A has the lower voltage level. As such, switches SW5 and SW6 to Battery B are OFF. Switch SW3 to Battery A is ON in column 514 and switches SW3 and SW4 are ON in column 516. Similarly, if Battery B has the lower voltage level, switches SW3 and SW4 to Battery A will remain OFF as illustrated in columns 518 and 520. Switches SW5 and SW6 to Battery B will turn ON depending on the charging current level.

In contrast to power being supplied by the DC power source, power may be supplied by one or more of the batteries in various battery power system supply modes. In a battery supply mode, the selector circuit 314 instructs switch SW1 to be OFF and SW2 to be ON. The selector circuit 314 instructs a battery supply mode to be instituted if the DC source is not present, or the DC is present but does not have a voltage level above the first threshold VT1 as determined by comparator CMP1. As such, the ACAV signal from the first comparator CMP1 to the selector output circuit 470 would be low indicating a battery supply mode. When the ACAV signal is low, the selector output circuit 470 will instruct SW1 to switch OFF and SW2 to switch ON.

In the embodiment of FIG. 3, there are essentially two normal battery system supply modes. In normal battery system supply mode 1 (nbssm1), the USE_A and USE_B signals from the PMU point to use of only one Battery A or B, the targeted battery is present and can supply the system at least a voltage level to enable the system to have a voltage level greater the VT3 threshold level. In normal battery system supply mode 2 (nbssm2), the USE_A and USE_B signals point to the use of Batteries A and B in parallel, both batteries are present, both batteries can supply the system at least a voltage level to enable the system to have a voltage level greater the VT3 threshold level, and both batteries have a respective voltage level within a predetermined voltage range of one another.

Figure 6:
FIG. 6 is an exemplary table illustrating how the selector circuit drives various switches to ON and OFF states depending on various input signals when the device is powered by various combinations of batteries.

FIG. 6 illustrates a table 600 showing various input signals for both battery system supply modes nbssm1 and nbssm2 and the corresponding state of switches SW1 to SW6. As indicated earlier, since battery system supply mode is instituted, switch SW1 is OFF and SW2 is ON. Columns 602 and 604 of table 600 illustrate the first battery supply mode nbssm1 where use of Battery A (column 602) or Battery B (column 604) is targeted or desired. The input validation signals VINP1 and VINP2 should be at acceptable levels (VINP1 high and VINP2 low) in these instances. Therefore, if power is to be supplied by Battery A (column 602), switches SW3 and SW4 will be ON and switches SW5 and SW6 will be OFF. In contrast, if power is to be supplied by Battery B (column 604), switches SW5 and SW6 will be ON and switches SW3 and SW4 will be OFF.

In the second normal battery supply mode (nbssm2), BATTCOMP signal from the comparator CMP4 is high indicating the voltages of Batteries A and B are within an acceptable limit. The parallel battery use enable (PBUE) signal is also high indicating all other conditions (including high VINP2 signal) for parallel battery use as monitored by the parallel battery use enable circuit 476 are satisfactory. As such switches SW3 and SW4 coupled to Battery A are ON and switches SW5 and SW6 coupled to Battery B are ON.

Somewhat similar to the charging situation, if USE_A and USE_B signals indicate a desire to use both Batteries A and B in parallel, but the PBUE signal is not enabled (e.g., PBUE is low), the battery with the higher voltage level compared to the other will be selected to provide discharging power to the system. As such, the switch states will be like that in column 602 if Battery A has the higher voltage and like that in column 604 if Battery B has the higher voltage.

The PMU 320 may also send a power save mode request to the selector circuit 314 if a DC power source is absent and low power consumption is desired to conserve battery life. If such a power save mode request is received by the selector circuit 314, the controller 315 will direct switch SW1 to turn OFF, switch SW2 to turn OFF, switch SW3 to turn OFF, switch SW4 to turn ON, switch SW5 to turn OFF, and switch SW6 to turn ON. As such, Battery A or B with the higher voltage level will supply power via an associated diode D3 or D5 respectively. In addition, the selector circuit's 314 own supply current will be highly reduced compared to normal operation contributing to overall device power savings in this power save mode.

In addition to the selector circuit earlier detailed for selecting two or more batteries for use in parallel, a charging circuit is also provided. In general, a charging circuit consistent with the invention speeds up the time to charge batteries in parallel by maximizing charging current provided to each battery.

Figure 7:
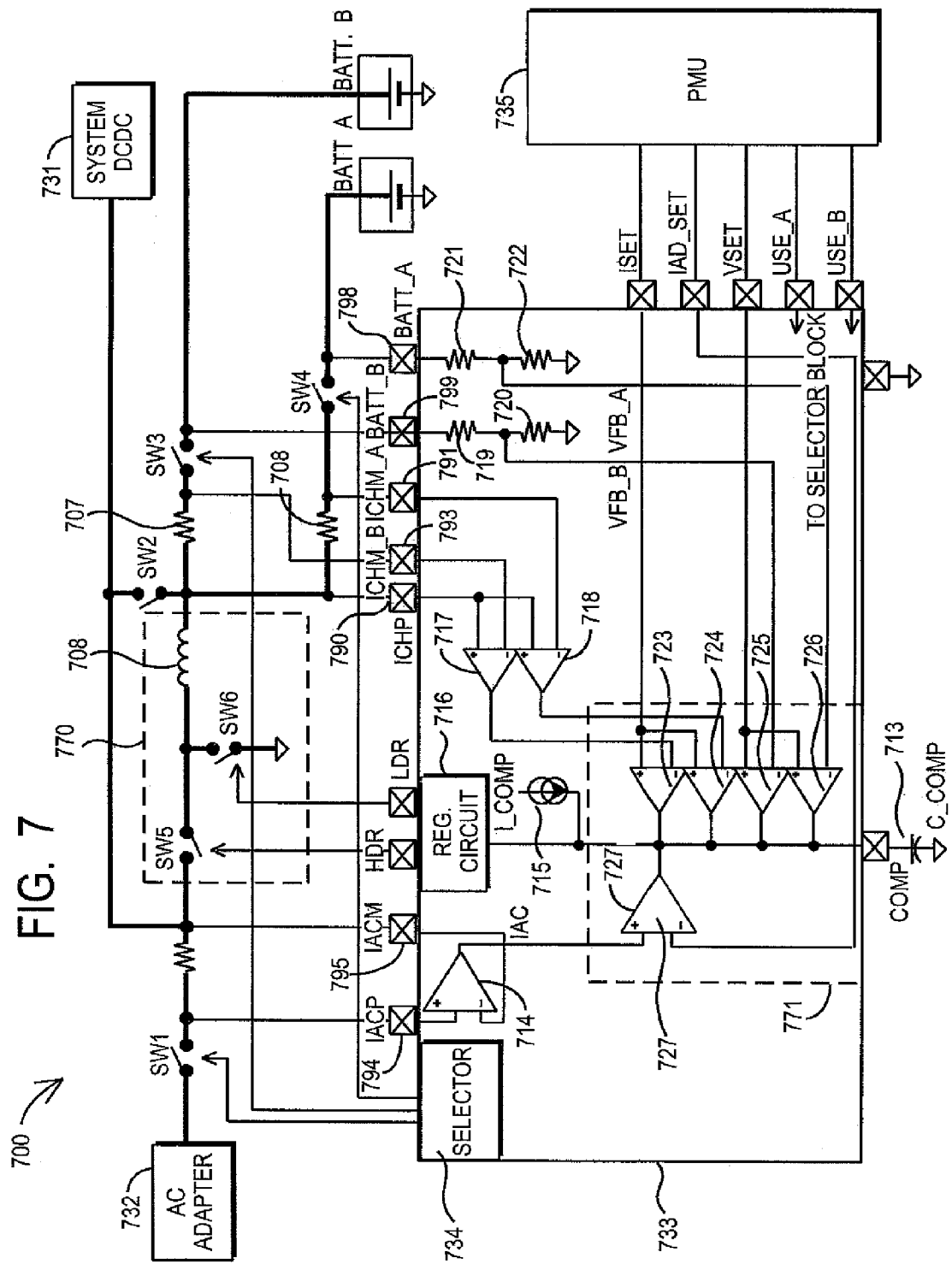
FIG. 7 is a circuit diagram of an exemplary charging circuit consistent with the invention for use with similar batteries having similar maximum charging parameters.

Turning to FIG. 7, one exemplary charging circuit 733 consistent with the invention is illustrated. The charging circuit 733 is illustrated as part of a power supply system 700 that includes various power sources such as an AC/DC adapter 732 and a host of batteries such as Battery A and B that are all capable of providing power to the system 731. The power supply system 700 may also include a selector circuit 734 for controlling the state of switches SW1, SW2, SW3, and SW4 and a DC to DC converter 770 controlled by the charging circuit 733. The selector circuit 734 and the charging circuit 733 may be implemented as separate integrated circuits, or, as illustrated, may also be integrated onto the same integrated circuit for convenience of installation and operation. A host power management unit (PMU) 735 may also provide control signals to the charging circuit 733 and the selector circuit 734 as further detailed herein.

In a battery charging operation mode, the selector circuit 734 would close switch SW1 and open switch SW2. The selector circuit would close switch SW3 to charge Battery B, switch SW4 to charge Battery A, or both switches SW3 and SW4 to provide charging current to Battery A and B in parallel. Switches SW3 and SW4 are bidirectional switches. That is, when each switch is open it completely blocks the power path between the charging circuit 733 and the associated Battery A or B. The selector circuit 734 may make such decisions based on control signals USE_A and USE_B from the PMU 735. As earlier detailed, despite USE_A and USE_B control signals indicating a desired use of Batteries A and B in parallel, the selector circuit 734 may check the voltage levels on Battery A and Battery B and enable operation in parallel only if the voltage of Battery A is within a predetermined voltage range of the voltage of Battery B. If the batteries are not within the predetermined voltage range, the selector circuit 734 may then first select the battery with the lower voltage level for charging.

Once the selector circuit 734 has selected a charging mode, the charging circuit 733 takes over control of the DC to DC converter 770. The output of the DC to DC converter 770 provides a system charging parameter, e.g., system charging current and voltage level, to the host of batteries. The host of batteries may include a plurality of rechargeable batteries and in this instance includes Batteries A and B that may be coupled in parallel. Batteries A and B may be in any state of charge from 0% to 100%. The DC to DC converter 770 may be any variety of DC to DC converters known in the art and may be controlled by any variety of control signals from the charging circuit 733. In one of many embodiments, the DC to DC converter may be a buck converter having a high side switch SW5, a low side switch SW6, and an inductor 708 and the control signal from the charging circuit 733 may be a pulse width modulated (PWM) signal. In this instance, as is known in the art, the duty cycle of the PWM control signal controls the state of the switches SW5, SW6 such that each switch is alternately turned ON and OFF. As such, the system charging current through inductor 705 and the system charging output voltage of the DC to DC converter is controlled by the PWM signal.

The charging circuit 733 generally includes a plurality of paths that provide associated control signals to a regulating circuit 716. As further detailed herein, the regulating circuit 716 then provides an output control signal to control the DC to DC converter 770 based on such control signals. For example, the regulating circuit 716 may provide a PWM control signal where the duty cycle varies to control the state of the high side switch SW5 and low side switch SW6.

Advantageously, the charging circuit 733 may have a path that receives an input signal at terminals 790, 791 and provides a signal to error amplifier 724 representative of the charging current being provided to Battery A. The voltage drop across sense resistor 708 may provide the input to terminals 790, 791. Because the sense resistor is typically quite small, an amplifier 718 may also be utilized to amplify the signal received at terminals 790, 791 before providing such signal to the error amplifier 724. Error amplifier 724 compares a signal representative of the charging current to Battery A with a maximum charging current level. In the embodiment of FIG. 7, the maximum charging current level ISET is provided directly as an analog signal from the host PMU 735.

Similarly, the charging circuit 733 may also have another path that receives an input signal at terminals 790, 793 and provides a signal to error amplifier 723 representative of the charging current being provided to Battery B. The voltage drop across sense resistor 707 may provide the input to terminals 790, 793. Because the sense resistor 707 is typically quite small, an amplifier 717 may also be utilized to amplify the signal received at terminals 790, 793 before providing such signal to the error amplifier 723. Error amplifier 723 compares a signal representative of the charging current to Battery B with a maximum charging current level for Battery B. In the embodiment of FIG. 7, the maximum charging current level ISET for Battery B is substantially similar to that of Battery A and hence both error amplifiers receive the same ISET signal from the PMU 735.

In addition to the paths that monitor charging current provided to each Battery A and B, additional paths monitor charging voltage provided to each Battery A and B. The path that monitors the charging voltage provided to Battery A may include resistors 721, 722 forming a resistor divider to scale down the voltage at terminal 798. The scaled down voltage level may then be provided to error amplifier 726. Error amplifier 726 compares a signal representative of the voltage of Battery A with a maximum charging voltage for Battery A. In the embodiment of FIG. 7, the maximum charging voltage for Battery A VSET is provided by the PMU 735. If the VSET level is exceeded by the voltage on Battery A, the regulating circuit 716 may reduce the output voltage of the DC to DC converter 770. In addition, or alternatively, the selector circuit 734 may open switch SW4 and hence disconnect Battery A in this instance.

The path that monitors the charging voltage provided to Battery B may include resistors 719, 720 forming a resistor divider to scale down the voltage at terminal 799. The scaled down voltage level may then be provided to error amplifier 725. Error amplifier 725 compares a signal representative of the voltage of Battery B with a maximum charging voltage for Battery B. In the embodiment of FIG. 7, the maximum charging voltage for Battery B is substantially similar to that of Battery A and hence both error amplifiers 725 and 726 receive the same VSET signal from the PMU 735. If the VSET level is exceeded by the voltage on Battery B, the regulating circuit 716 may reduce the output voltage of the DC to DC converter 770. In addition, or alternatively, the selector circuit 734 may open switch SW3 and hence disconnect Battery B in this instance.

Yet another control path that monitors the current provided by the AC adapter 732 may include amplifier 714 and error amplifier 727. A voltage drop across sense resistor 702 may provide the input to terminals 794, 795 of the charging circuit 733. Because the sense resistor 702 is typically quite small, the amplifier 714 may also be utilized to amplify the signal received at terminals 794, 795 before providing such signal to the error amplifier 727. Error amplifier 727 compares a signal representative of the current from the AC adapter 732 with a maximum current level for the AC adapter or IAD_SET as provided by the PMU 735 in this instance.

The plurality 771 of error amplifiers 723, 724, 725, 726, 727 from the plurality of paths are configured as an analog "wired-OR" topology such that the error amplifier that first detects a condition exceeding the associated maximum level controls the regulating circuit 716. For example, if error amplifier 723 first detected that the charging current to Battery B exceeded the ISET level, it would control the regulating circuit 716. The regulating circuit 716 would then reduce the charging current provided by the DC to DC converter 770, e.g., by decreasing the duty cycle of a PWM control signal provided to the high side switch SW5 and low side switch SW6. If none of the maximum conditions being monitored by the error amplifiers 723, 724, 725, 726, 727 are met, then capacitor 713 is charged until at least one of the conditions is met. As such, in the embodiment of FIG. 7 error amplifier 723 limits the charging current to Battery B to the ISET level. Error amplifier 724 limits the charging current to Battery A to the ISET level. Error amplifier 725 limits the charging voltage on Battery B to the VSET level. Error amplifier 726 limits the charging voltage on Battery A to the VSET level. Finally, error amplifier 727 limits the current level provided by the AC adapter 732 to the IAD_SET level.

Figure 8:
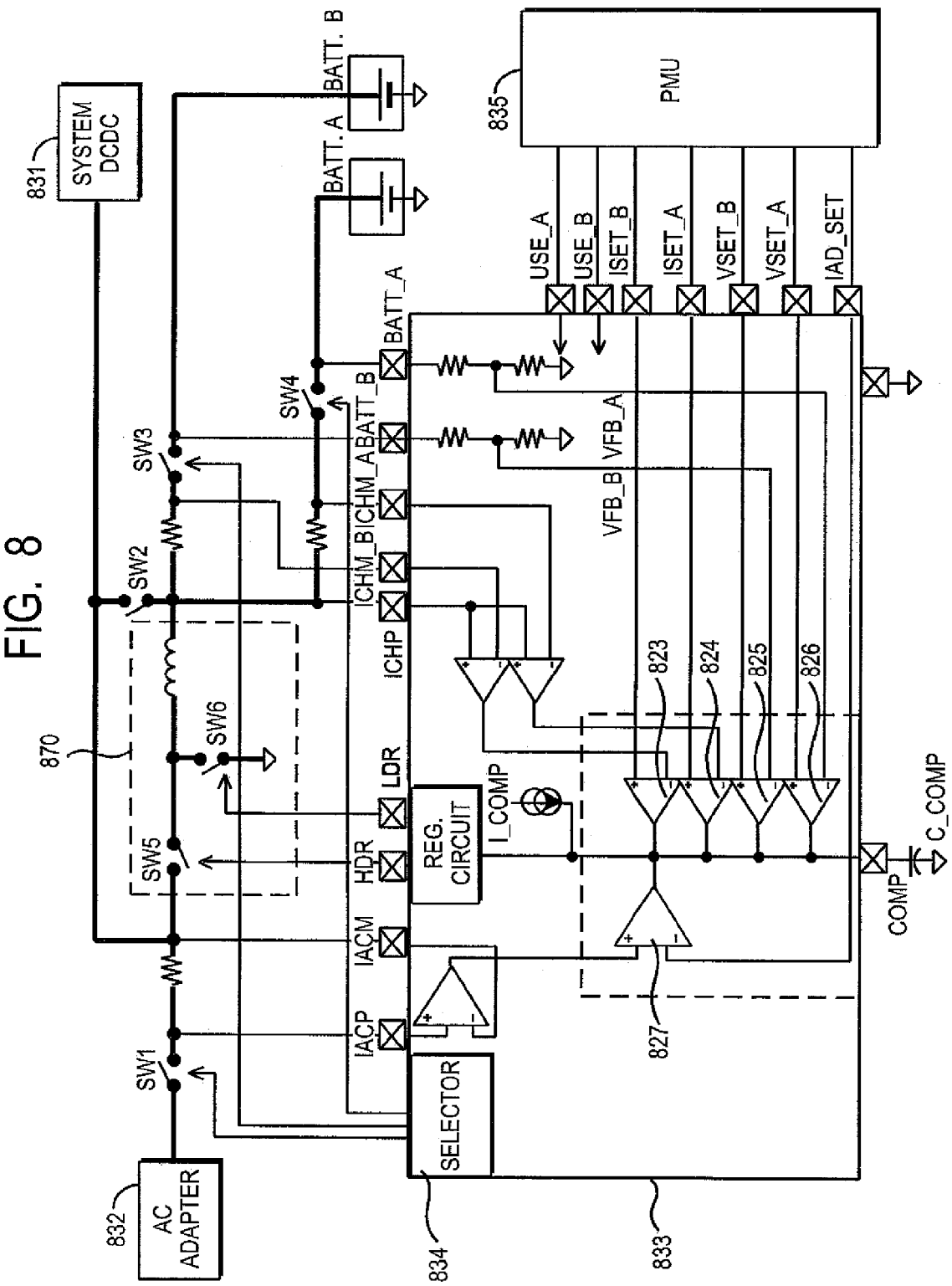
FIG. 8 is a circuit diagram of another exemplary charging circuit consistent with the invention where each battery may have different maximum charging parameters.

FIG. 8 illustrates another embodiment of a charging circuit 833 consistent with the invention. In general, the charging circuit 833 can accept a variety of maximum charging parameter settings for each battery. For instance, error amplifier 823 may receive an ISET_B signal from the PMU 835 representative of the maximum charging current for a particular Battery B. In contrast, error amplifier 824 may receive an ISET_A signal from the PMU 835 representative of the maximum charging current for a particular Battery A. Similarly, error amplifiers 825 and 826 may receive separate VSET_B and VSET_A signals representative of differing maximum charging voltage levels for Battery B and A. Hence, distinct pairs of maximum charging current values and maximum charging voltage values may be set independently for each individual battery. When the selector circuit 834 enables parallel charging of Batteries A and B, the charging circuit 833 will increase an output charging parameter of the DC to DC converter 870 until one of the predetermined maximum charging current or voltage values for any one of the batteries being charged in parallel is reached.

Figure 9:
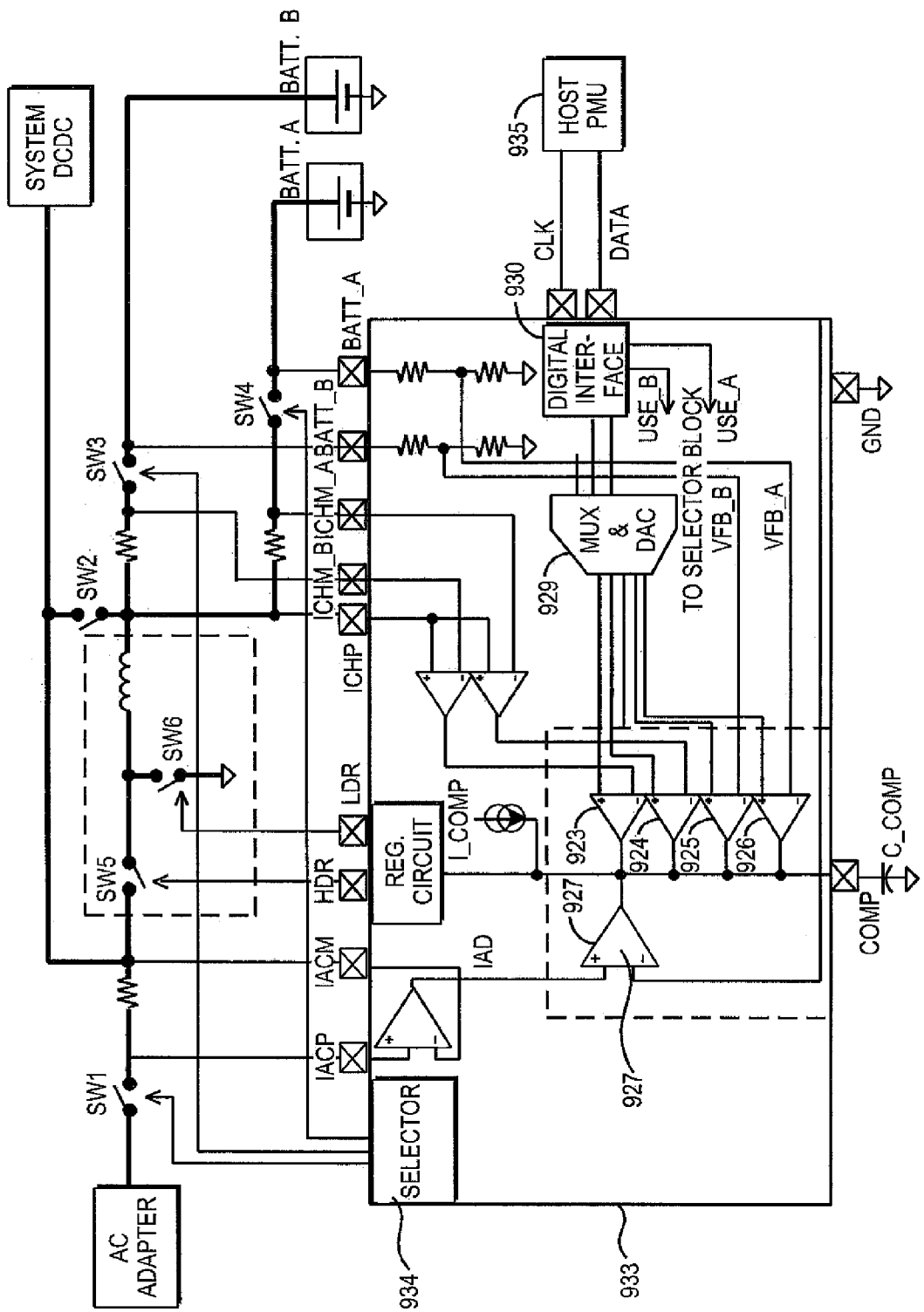
FIG. 9 is a circuit diagram of another exemplary charging circuit consistent with the invention configured to receive digital signals from an associated power management unit.

FIG. 9 illustrates yet another embodiment of a charging circuit 933 consistent with the invention. In this embodiment, the PMU 935 provides digital signals to the charging circuit 933 as opposed to analog signals. A digital interface 930 accepts the digital signals. The digital interface may be any variety of digital interfaces such as a SMBus or 12C interface. A multiplexer (MUX) and digital to analog converter (DAC) 929 is also provided. In the embodiment of FIG. 9, the MUX is a five channel MUX to provide five control signals to each error amplifier 923, 924, 925, 926, 927 representative of a maximum parameter condition. Of course, the number of channels of the MUX depends, in part, on the total number of error amplifiers. The PMU 935 may also provide separate VSET and ISET signals to error amplifiers 923, 924, 925, 926 similar to that detailed in FIG. 8. Alternatively, the PMU 935 may provide the same VSET signal to error amplifiers 925, 926 and the same ISET signal to error amplifiers 923, 924 similar to that detailed in FIG. 7.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A power supply system comprising:
    a host power management unit configured to execute a power management routine;
    a charging circuit for controlling a system charging parameter provided to a plurality of batteries by a DC to DC converter, said charging circuit further comprising:
    a first path configured to monitor a first battery charging current provided to a first battery;
    a second path configured to monitor a second battery charging current provided to a second battery;
    a third path configured to monitor a first battery charging voltage provided to said first battery; and
    a fourth path configured to monitor a second battery charging voltage provided to said second battery; and
    a regulating circuit configured to reduce said system charging parameter provided to said plurality of batteries by said DC to DC converter if said first battery charging current exceeds a first maximum charging current level or said second battery charging current exceeds a second maximum charging current level, or said first battery charging voltage exceeds a first maximum charging voltage level when said first battery and said second battery are coupled in parallel, or said second battery charging voltage exceeds a second maximum charging voltage level, said first and said second maximum charging current levels and said first and said second maximum charging voltage levels provided to at least one input terminal of said charging circuit by said host power management unit.

2. The charging circuit of claim 1, wherein said first maximum charging current level is substantially equal to said second maximum charging current level.

3. The charging circuit of claim 1, wherein said first maximum charging voltage level is substantially equal to said second maximum charging voltage level.

4. The charging circuit of claim 1, wherein said first path comprises a first error amplifier configured to receive a first monitoring signal representative of said first battery charging current and a first comparison signal representative of said first maximum charging current level, and to provide a first control signal to said regulating circuit based on a difference between said first monitoring signal and said first comparison signal, and wherein said second path comprises a second error amplifier configured to receive a second monitoring signal representative of said second battery charging current and a second comparison signal representative of said second maximum charging current level, and to provide a second control signal to said regulating circuit based on a difference between said second monitoring signal and said second comparison signal, an output of said first and second error amplifiers coupled directly to said regulating circuit, and wherein said first error amplifier controls said regulating circuit if said first error amplifier detects said first charging current is greater than said first maximum charging current level before said second error amplifier detects said second charging current is greater than said second maximum charging current level.

5. A method for controlling a system charging parameter comprising:
    providing a control signal to a DC to DC converter by a regulating circuit;
    monitoring a first battery charging current provided to a first battery by a first path;
    monitoring a second battery charging current provided to a second battery by a second path;
    monitoring a first battery charging voltage provided to said first battery by a third path; and
    monitoring a second battery charging voltage provided to said second battery by a fourth path; and
    reducing said system charging parameter provided to a plurality of batteries by said DC to DC converter that may be coupled in parallel, if said first battery charging current exceeds a first maximum charging current level when said first battery and said second battery are coupled in parallel or said second battery charging current exceeds a second maximum charging current level, or said first battery charging voltage exceeds a first maximum charging voltage level, or said second battery charging voltage exceeds a second maximum charging voltage level, said first and said second maximum charging current levels and said first and said second maximum charging voltage levels provided to at least one input terminal of a charging circuit by a host power management unit.

6. The method of controlling a system charging parameter of claim 5, wherein said first path comprises a first error amplifier configured to receive a first monitoring signal representative of said first battery charging current and a first comparison signal representative of said first maximum charging current level, and to provide a first control signal to said regulating circuit based on a difference between said first monitoring signal and said first comparison signal, and wherein said second path comprises a second err amplifier configured to receive a second monitoring signal representative of said second battery charging current and a second comparison signal representative of said second maximum charging current level, and to provide a second control signal to said regulating circuit based on a difference between said second monitoring signal and said second comparison signal, an output of said first and said second error amplifiers coupled directly to said regulating circuit, and wherein said first error amplifier controls said regulating circuit if said first error amplifier detects said first charging current is greater than said first maximum charging current level before said second error amplifier detects said second charging current is greater than said second maximum charging current level.

7. The method of claim 5, wherein said first maximum charging current level is substantially equal to said second maximum charging current level.

8. The method of claim 5, wherein said first maximum charging voltage level is substantially equal to said second maximum charging voltage level.

9. An electronic device comprising:
a power management unit configured to provide an output signal representative of at least a first maximum charging current level, a second maximum charging current level, a first maximum charging voltage level, and a second maximum charging voltage level;
a charging circuit for controlling a system charging parameter provided to said plurality of batteries by a DC to DC converter, said charging circuit further comprising:
a first path configured to monitor a first battery charging current provided to a first battery and compare said first battery charging current to said first maximum charging current level;
a second path configured to monitor a second battery charging current level provided to a second battery and compare said second battery charging current to said second maximum charging current level;
a third path configured to monitor a first battery charging voltage provided to said first battery and compare said first battery charging voltage to said first maximum charging voltage level; and
a fourth path configured to monitor a second battery charging voltage provided to said second battery and compare said second battery charging voltage to said second maximum charging voltage level; and
a regulating circuit configured to reduce said system charging parameter provided to a plurality of batteries by said DC to DC converter if said first battery charging current exceeds said first maximum charging current level or said second battery charging current exceeds said second maximum charging current level, or said first battery charging voltage exceeds said first maximum charging voltage level, or said second battery charging voltage exceeds said second maximum charging voltage level by said DC to DC converter, said first and said second maximum charging current levels and said first and said second maximum charging voltage levels provided to at least one input terminal of said charging circuit by said power management unit.

10. The electronic device of claim 9, wherein said output signal from said power management unit comprises an analog signal.

11. The electronic device of claim 9, wherein said output signal from said power management unit comprises a digital signal.

12. The electronic device of claim 11, wherein said charging circuit further comprising:
a digital interface configured to receive said digital signal from said power management unit and provide an interface output signal;
a DAC configured to receive said interface output signal and convert said signal to an analog signal representative of said interface output signal; and
a multiplexer to separate said analog signal into a plurality of analog signals representative of at least said maximum charging current level, said second maximum charging current level, said first maximum charging voltage level, and said second maximum charging circuit voltage level.

* * * * *